United States Patent [19]

Muto et al.

[11] Patent Number: 4,571,011
[45] Date of Patent: Feb. 18, 1986

[54] OIL SEALING BEARING FOR AXIALLY RECIPROCATING SHAFT

[75] Inventors: Yoshiyuki Muto; Tadao Etani, both of Tokyo, Japan

[73] Assignee: The Japan Tobacco & Salt Public Corporation, Tokyo, Japan

[21] Appl. No.: 579,873

[22] Filed: Feb. 13, 1984

[30] Foreign Application Priority Data

Feb. 23, 1983 [JP] Japan .................................. 58-27588

[51] Int. Cl.$^4$ .......................... F16C 17/26; F16J 15/16
[52] U.S. Cl. ........................................ 308/3.5; 277/174
[58] Field of Search ..................... 308/5 R, 3.5, 187.1; 384/137, 608, 477; 277/24, 139, 140, 173, 174, 175, 176, 177; 74/566, 467

[56] References Cited

U.S. PATENT DOCUMENTS

| | | | |
|---|---|---|---|
| 2,657,762 | 11/1953 | Peters | 308/5 R X |
| 2,806,721 | 9/1957 | Fagg et al. | 308/3.5 |
| 3,190,702 | 6/1965 | Flick | 308/3.5 |
| 3,471,157 | 10/1969 | Swearingen | 277/174 X |
| 3,889,958 | 6/1975 | Bennett | 277/174 X |

Primary Examiner—Stuart S. Levy
Assistant Examiner—Lynn M. Sohacki
Attorney, Agent, or Firm—Shlesinger, Arkwright, Garvey & Fado

[57] ABSTRACT

An oil sealing bearing for an axially reciprocating shaft is provided.

Tobacco products are evaluated in terms of their fragrance or aroma, however the reciprocating shaft through the oil sealing bearing is required to effect its function reliably and very quickly, that is the reciprocating shaft requires a slide bearing which offers low frictional resistance and have a long life with a sufficient lubricating oil, and further requires a perfect oil seal effect lest the lubricating oil should blot onto any processing section where tobacco is loaded.

The oil sealing bearing comprises two slide supports, a cap member and an annular oil scraper. The annular oil scraper serves to scrape off excess oil in an oil film formed non-uniformly on the surface of an axially reciprocating shaft and is disposed in a bearing body such that it is always in a coaxial relation to the shaft regardless of even very quick radial displacement of the shaft in the bearing body. Thus, it is possible to obtain an oil sealing bearing which can eliminate the possibility for lubricating oil to be brought into a packing zone where packing of tobacco products is being done.

Therefore, even in the case of high speed of the shaft, the bearing can obtain competing requirements such as the oil seal effect and fragrance of tobacco products.

10 Claims, 2 Drawing Figures

OIL SEALING BEARING FOR AXIALLY RECIPROCATING SHAFT

BACKGROND OF THE INVENTION

This invention relates to an oil sealing bearing for axially reciprocating shaft.

Many automatic machines employ axially reciprocating shafts which are lubricated through an oil bath. Particularly, tobacco product packing machines employ axially reciprocating shafts of the oil bath lubricating type for folding means for folding packing paper and pushers for moving products.

The pusher for moving products is usually and necessarily employed in such cases as where products are transported and packed using intermittently rotating turrets or bucket conveyors. This is so because the pusher is thought to be the most convenient means for effecting transfer of a product from one transporting means to another transporting means.

The reciprocation of the pusher, however, must be completed while a turret or a bucket is at a halt. This means that the pusher is required to effect its function reliably and very quickly.

Such a shaft intended to be capable of quick reciprocations, naturally requires a bearing, which will offer low frictional resistance and have long life. To meet these requirements, structures are adopted, which are supplied with sufficient lubricating oil so that they will never get out of lublicating oil film.

Tobacco products, meanwhile, are evaluated in terms of their fragrance or aroma. For this reason, processing machines dealing with tobacco essentially needs competing requirements such as the oil seal and fragrance of tobacco. This means that the drive section of the machine requires a perfect oil seal lest lubricating oil used in it should blot onto any processing section where tobacco is loaded. In the event of the lubricating oil in the drive section of a tobacco product packing machine blotting into a portion of the machine where tobacco products are loaded, it would run not only on the packing paper but also on the tobacco wrapped therein. Consequently, the product is deprived of its commercial value so that it must be discarded to be burnt.

It has been in practice to use an oil seal including two or three rubber lips for an axially reciprocating shaft.

However, the speed of pushers or the like having axially reciprocating shafts has been strikingly increased with demands for increasing speed of machine operation, so that the conventional oil seals made of rubber for axially reciprocating shafts can no longer satisfactorily fulfill the role.

More specifically, one of the significant problems is that an abrasion of lips are remarkably due to high speed of operation, that is, their life is extremely curtailed. Another significant problem arises from the fact that each rubber lip of oil seal and shaft are in contact with each other under a predetermined pressure. Therefore, the frictional resistance of the shaft on sliding is increased, giving rise to vibrations of the driving system during high speed reciprocation of the shaft and, in an extreme case, making it impossible to continue the high speed reciprocation indefinitely.

SUMMARY OF THE INVENTION

An object of the invention is to provide an oil sealing bearing for an axially reciprocating shaft in a processing machine dealing with tobacco products as noted above or the like, which can overcome the drawbacks described above and offers very low frictional resistance while providing satisfactory oil seal function.

Another object of the invention is to provide an oil sealing bearing, which has an annular oil film scraper which is a floating type and is made of a non-elastic material and loosely surrounding an axially reciprocating shaft.

According to the invention, there is provided an oil sealing bearing for an axially reciprocating shaft, which comprises an annular oil scraper in a loosely surrounding engagement with the axially reciprocating shaft and accomodated in an accommodating space formed in a bearing body, said annular oil scraper being made of a non-elastic material and having a stem portion and a scraping portion integral therewith and extending therefrom along the peripheral surface of the shaft, said annular oil scraper being accommodated in the space noted above such that it is restricted against axial movement but can be freely displaced in radial directions with respect to the bearing body.

Generally, lubricating oil that has lubricated a bearing section slides over the surface of the shaft in the form of a thick oil film adhering to the shaft. According to the invention, the oil film is scraped off by a scraper of floating type and returned to an inner portion of the machine, i.e., an oil bath, or to a lubricating oil supply system path, whereby leakage of oil into a zone where tobacco is found can be prevented.

Regarding the lubrication of a moving shaft, it is known from the fluid lubrication theories of Sommerfeld that a wedge-like oil film is formed on a rotating shaft. However, it is theoretically impossible that sufficient oil film could be formed on an axially reciprocating shaft, and failure of formation of oil film is liable to occur locally and cause seizure of the shaft with the bearing in the case when the radial load on the shaft is high.

In order to prevent the failure of formation of oil film and ensure lubrication of the axially reciprocating pusher shaft in the bearing section, more than enough oil film is always formed on the surface of the pusher shaft by issuing lubricating oil on the pertinent portion of the shaft.

Generally, to obtain the sliding engagement between the shaft and bearing, an extent of engagement for a bore and a shaft are recommended to be $H_7$ and $g_6$ respectively (prescribed by Japanese Industrial Standards as follows; $H_7[+21 \ \mu m - 0 \ \mu m]$, $g_6[-7 \ \mu m \infty -20 \ \mu m]$). Where a plurality of bearings are provided for a single shaft, it is necessary that the shaft diameter should be a size of $g_6$ or less by taking the dimensional errors involved in the installation of the bearings on brackets, straightness of the shaft, thermal expansion of the shaft and other factors into considerations in order to maintain the engagement gap within the recommended value even in the worst place.

Thus, with the shaft bearing, radial load as noted above a gap greater than the gap in the case of engagement of orders of $H_7$ and $g_6$ respectively is produced between the shaft and bearing. In this case, the shaft is inclined and is not concentric with the bearing in a strict sense. That is, the gap between the shaft and bearing varies with the circumferential position on the shaft.

Where a prior art oil seal is mounted on an axially reciprocating shaft in the relation to bearings as described above, the shaft is fitted in an oil seal bore which is formed to be concentric with a reference mounting surface of the bearings. This positional relation between the oil seal lip and shaft actually does not substantially differ from the situation described above, and the sealing effect and scraping effect solely depend on the deformation of the elastic material of the oil seal.

According to the invention, a scraper made of a nonelastic material can be adopted. This scraper is automatically positioned with respect to the axis of the axially reciprocating shaft to be ready for scraping off an oil film formed on the shaft surface. The reference surface that determines the radial position of the scraper is always the outer periphery of the shaft, so that the scraper can always be held coaxial with the shaft.

DETAILED DESCRIPTION OF THE EMBODIMENTS

Now, an embodiment of the invention will be described with reference to the accompanying drawings.

Figure 1:
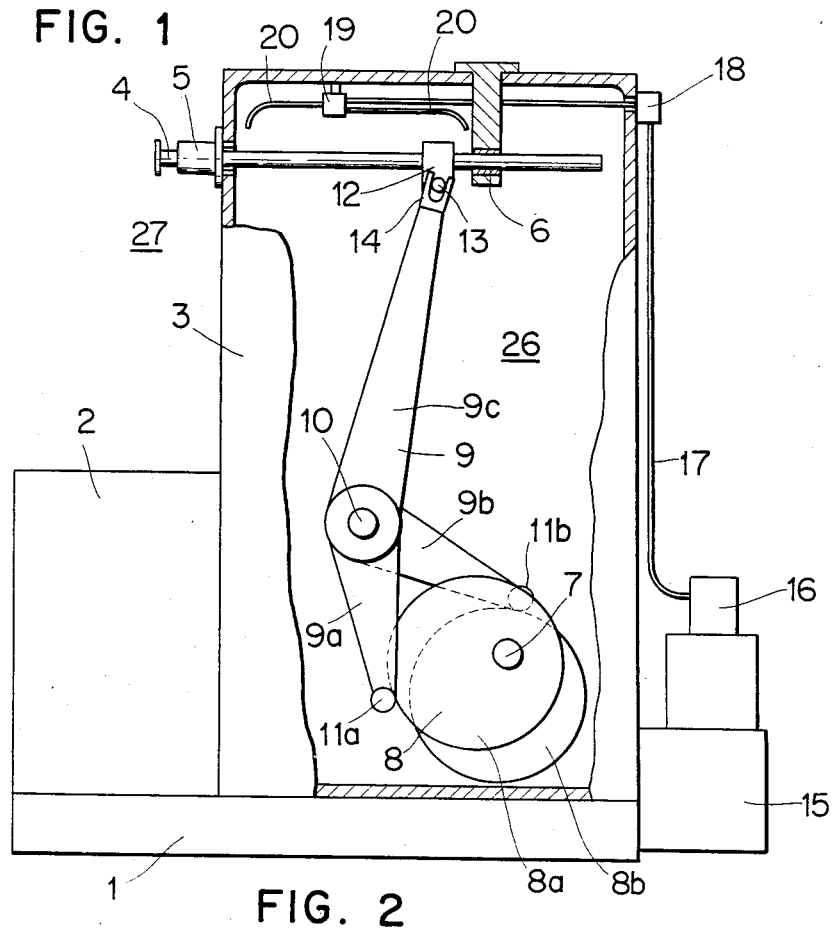
FIG. 1 is a front view, partly broken away, showing an axially reciprocating shaft drive section with an oil sealing bearing according to the invention.

FIG. 1 is a front view, partly broken away, showing a drive section for an axially reciprocating shaft used as a pusher shaft for tobacco packing machine.

A base 1 supports a gear box 3. The base 1 may also supports other parts, e.g., another gear box 2, irrelevant to the pusher shaft drive section but which are necessary for the operation of the machine. A pusher shaft 4 for transferring tobacco products is supported for axial reciprocation by two bearings 5 and 6. The pusher shaft 4 is driven by a drive mechanism including a cam, a cam lever and a yoke. More specifically, a continuously rotating shaft 7 carries a composite cam 8 consisting of cams 8a and 8b. A cam lever 9 is pivotally mounted on a cam lever shaft 10 on one side of the composite cam 8. The cam lever 9 has three arms 9a to 9c radially extending from the shaft 10. The arms 9a and 9b have respective cam followers 11a and 11b at their free end. The cam followers 11a and 11b are in contact with the peripheral cam faces of cams 8a and 8b. The arm 9c extends upwardly in the Figure and is coupled to the pusher shaft 4 for driving the same. The pusher shaft 4 has a braket 12 secured to it. A roller follower 13 is mounted in the bracket 12. The cam lever arm 9c has a yoke 14 at its free end, and the roller follower 13 is slidably received in a U-shaped recess of the yoke 14.

FIG. 1 illustrates a lubricating system wherein an oil supply pump driven by an independent motor is used for lubricating the reciprocating pusher shaft 4. Lubricating oil stored in an oil tank 15 is withdrawn by an oil pump 16 and is forced by pressure through a pipe 17 and an elbow 18 into a distributor 19 disposed in the gear box 3 to be supplied from end pipes 20 to given places. Lubricating oil that has done the job of lubrication after being issued from the end pipes and now being excess oil is allowed to fall due to the gravitation in the gear box 3 to be collected on the bottom thereof and re-circulated into the oil tank 15.

Figure 2:
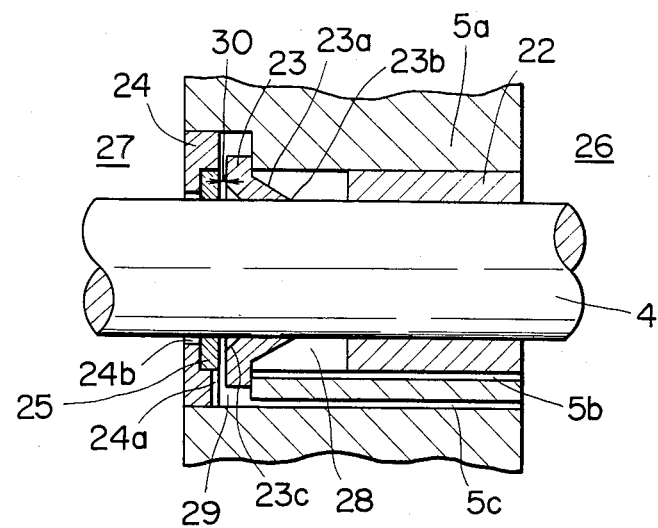
FIG. 2 is a fragmentary sectional view, to an enlarged scale, showing the detailed structure of the oil seal device.

FIG. 2 shows the bearing section 5 with oil seal in detail.

It is necessary that a zone 26 in the gear box 3, in which the lubrication is controlled, and a zone 27, in which a packing turret, folding pawls, pushers, etc. are being moved for packing and transporting tobacco products, can be made distinct from each other by an oil seal that is present in an atmosphere filled with the lubricating oil, and even a very slight quantity of oil must not leak toward the zone 27.

In the details of the bearing section 5, the pusher shaft 4 extending through the section 5 penetrates a slide bearing 22, an annular member 23 and a cap 24 in the mentioned order from the side of the zone 26 to the side of the zone 27. In the illustrated example, the slide bearing 22 and cap 24 are accommodated in a bore formed in a bearing body 5a, the diameter of the bore being larger than the diameter of the pusher shaft 4.

The slide bearing 22 is secured to the bearing body 5a and loosely surrounds and guides the pusher shaft 4 as the shaft 4 is moved reciprocally forth through the bearing section. The slide bearing 22 is calked to be secured to the pusher shaft 4 with a clearance. The slide bearing 22 extends from an end of the zone 26, in which the lubrication is controlled, in the bearing body 5a, but it does not extend throughout the bearing body 5a up to the other end thereof but extends only up to an intermediate position thereof. It is thus spaced apart from the annular member 23.

Said bearing body 5a, said slide bearing 22 accommodated in the bore of the bearing body 5a, said pusher shaft 4 and said cap 24 cooperate to define an annular space including a small diameter section or gap space 28 and a large diameter section or accommodating space 29 which is open to the zone 27. The cap 24 is mounted in a portion of the step increased-diameter bore adjacent to the zone 27. The large diameter section or accommodating space 29, which accommodates the annular member 23 as will be described later, is defined between the inner surface of the cap 24 and the shoulder of the increased-diameter bore.

The cap 24 is secured to the bearing body 5a and has a central bore which is penetrated by the pusher shaft 4 and further has another slide bearing 25 secured thereof. The central bore suitably has a diameter such that a gap 24b of approximately 0.5 mm is provided between the wall of the bore and the pusher shaft 4.

The annular member 23 fits on the pusher shaft 4 such that it is partly accommodated in the space 29.

More specifically, its disc-like stem portion is placed in the space 29, and the thickness dimension of the stem in the axial direction is slightly smaller than the corresponding dimension of the space 29, thus defining a slight gap 30. The stem has a radial dimension such that a considerable space is defined between the radial dimension and the wall of the space 29.

The annular member 23 has an annular scraping portion 23a extending from the stem toward the slide bearing 22. The scraping portion 23a is tapering toward its end and has a sharp edge 23b at the end. The annular member 23 with the scraping portion 23a is made of a non-elastic material which is advantageous for the formation of the edge 23b, has dimensional stability, wear resistance and low frictional resistance; it is suitably a phosphor bronze molding.

While the annular member 23 is loosely fitted on the pusher shaft 4, the gap of loose fitting is desirably as small as possible provided smooth motion of the pusher shaft 4 is ensured.

In a stroke, that is a forward stroke of the pusher shaft 4, in which the shaft 4 slides outward the gear box 3, a thick film of oil remains formed on the surface of the shaft 4 ever emerging from the slide bearing 22.

Then, the oil film is moved with the pusher shaft 4, but when it proceeds from the space 28 into the annular oil scraper 23, it is scraped off the surface of the pusher shaft 4 by the edge 23b of the scraping portion 23a. Thus, oil remains only in a very thin uniform film on the surface of the pusher shaft 4 having passed by the edge 23b. This thin oil film lubricates the section of the pusher shaft 4 in engagement with the annular oil scraper 23.

The annular oil scraper 23 is restricted against axial movement by its stem portion accommodated in the accommodating space 29, while it can be freely displaced in radial directions. Owing to this freedom of radial displacement the axial pressure load on the scraper 23 is released via the slight gap 30. Thus, the scraper 23 is supported by the sole pusher shaft 4 surrounded by it. Also, it is low in weight, typically of the order of several grams. Thus, it is always floatingly automatically centered with respect to the pusher shaft 4 so that it can reliably provide an oil film scraping function. The gap 30 has a range of a width which is of the order of 0.03 mm, and the width is sufficient to ensure the reliable scraper function.

In another stroke, that is a backward stroke of the pusher shaft 4, in which the pusher shaft 4 retreats into the gear box 3, a slight oil film on the surface thereof may be scraped off by the other edge 23c of the annular oil scraper 23. This separation of oil film can be prevented by slightly chamfering the edge 23c for the oil film on the surface of the pusher shaft 4 in the retreat as is very thin. In order to cope with the case of the separation of oil film noted above, the inner side of the cap 24 is formed with a recess which is communicated with the space 29 via an oil gutter 24a.

The space 28 which is provided for the scraping of oil film in the forward stroke of the pusher shaft 4, constitutes an oil pool. The bearing body 5a is provided with an oil gutter 5b communicating with the space 28 and opening outside said bearing i.e. the interior of the gear box 3 and also an oil conduit 5c bored therein communicating with the accommodating space 29 and opening outside the bearing body i.e. the interior of the gear box 3. The oil scraped off the pusher shaft 4 thus is led back to the interior of the gear box 3.

The cap 24 constitutes one end wall of the space 29 and restricts the annular oil scraper 23 against axial movement with the pusher shaft 4. Since very fine pieces or tobacco and paper are flying in the zone 27 outside the gear box 3, the cap 24 is preferably designed such that it can serve as a dust seal to prevent intrusion of the fine particles noted above into the bearing section 5, and hence into the gear box 3.

As has been described in the foregoing, according to the invention, a scraper, which serves to scrape off excess oil in an oil film formed non-uniformly on the surface of an axially reciprocating shaft, is disposed in a bearing section such that it is always in a coaxial relation to the shaft regardless of even very quick radial displacement of the shaft in the bearing section. Thus it is possible to obtain an oil sealing bearing, which can eliminate the possibility for lubricating oil to be brought into a packing zone where packing of tobacco products is being done.

What is claimed is:

1. An oil sealing bearing for an axially reciprocating shaft comprising:

a bearing body having a bore formed therein;
a first slide bearing element secured to said bearing body within said bore to support an axially reciprocating shaft;
cap means secured to said bearing body within said bore, and having a second slide bearing element therewithin, said bearing body, said first slide bearing element, said cap means and said axially reciprocating shaft cooperating to define an annular space which includes a small diameter section in the form of a gap space and a large diameter section in the form of an accommodating space; and,
annular oil scraping means for scraping an excess amount of oil film to form a thin uniform film, said annular oil scraping means being in a loosely surrounding engagement with said axially reciprocating shaft and having a first section extending in said small diameter section and having a second section extending in a large diameter section, said second section of said annular scraping menas having an axial size smaller than said large diameter section of said annular space to permit restricted axial movement thereof.

2. An oil sealing bearing according to claim 1, wherein said first section has a portion converging toward the axially reciprocating shaft.

3. An oil sealing bearing according to claim 1, wherein said second section has a radial size larger than said small diameter section.

4. An oil sealing bearing according to claim 1, wherein said annular scraping means is made of a nonelastic material to have dimensional stability, wear resistance and low frictional resistance.

5. An oil sealing bearing according to claim 1, wherein said annular scraping means has a weight of the order of several grams, said weight allowing said annular scraping means to be floatingly automatically centered with respect to said shaft.

6. An oil sealing bearing according to claim 5, wherein said annular oil scraping means is a phosphor bronze molding.

7. An oil sealing bearing according to claim 1, wherein said bearing body has a first oil gutter communicating with the small diameter section and opening outside said bearing and an oil conduit bored therein communicating with the large diameter section and opening outside said bearing whereas said cap means has a second gutter communicating with the large diameter section.

8. An oil sealing bearing according to claim 1, wherein said annular scraping means has radial dimensions respectively smaller than said large and small diameter sections of said annular space to permit free displacement of said annular scraping means in radial directions whereby said annular scraping means is floating, being solely supported by said reciprocating shaft and always in coaxial relation with respect to said reciprocating shaft.

9. An oil sealing bearing according to claim 8, wherein said first section of said annular scraping means tapers towards its end and has a sharp edge thereat for scraping excess oil, and said second section of said annular scraping means has a chamfered edge at the end thereof for preventing the separation of the oil film on said reciprocating shaft.

10. An oil sealing bearing assembly for an axially reciprocating shaft, comprising:

a bearing body having a bore therein;

first and second slide bearing elements in the bore of said bearing body to support an axially reciprocating shaft, said first and second slide bearing elements being axially spaced from one another, said bearing body, said first and second slide bearing elements and said axially reciprocating shaft cooperating to define an annular space having a small diameter space and a large diameter space;

an annular oil scraping member for scraping excess oil from said shaft so as to form a thin uniform oil film on said shaft, said annular scraping member being mounted about said shaft in loose engagement therewith and having a disc-like stem portion and a scraping portion extending from said stem portion, tapering towards its end and having a sharp axially projecting edge thereat for scraping excess oil, said stem portion having at its end a chamfered edge for preventing the separation of the oil film on said reciprocating shaft;

said scraping portion extending into said small diameter space and said stem portion extending into said large diameter space, said stem portion having a radial dimension larger than said small diameter space and an axial dimension smaller than the axial dimension of said large diameter space to permit restricted axial movement of said annular scraping member; and said annular scraping member having radial dimensions respectively smaller than said large and small diameter spaces to permit free displacement of said annular scraping member in radial directions whereby said annular scraping member is floating, being solely supported by said reciprocating shaft and always in coaxial relation with respect to said reciprocating shaft.

* * * * *